Jan. 16, 1934. O. C. JOHNSON 1,944,010
CONTINUOUS FILM MOTION CINEMATOGRAPH PROJECTOR
Filed Aug. 15, 1930 2 Sheets-Sheet 1
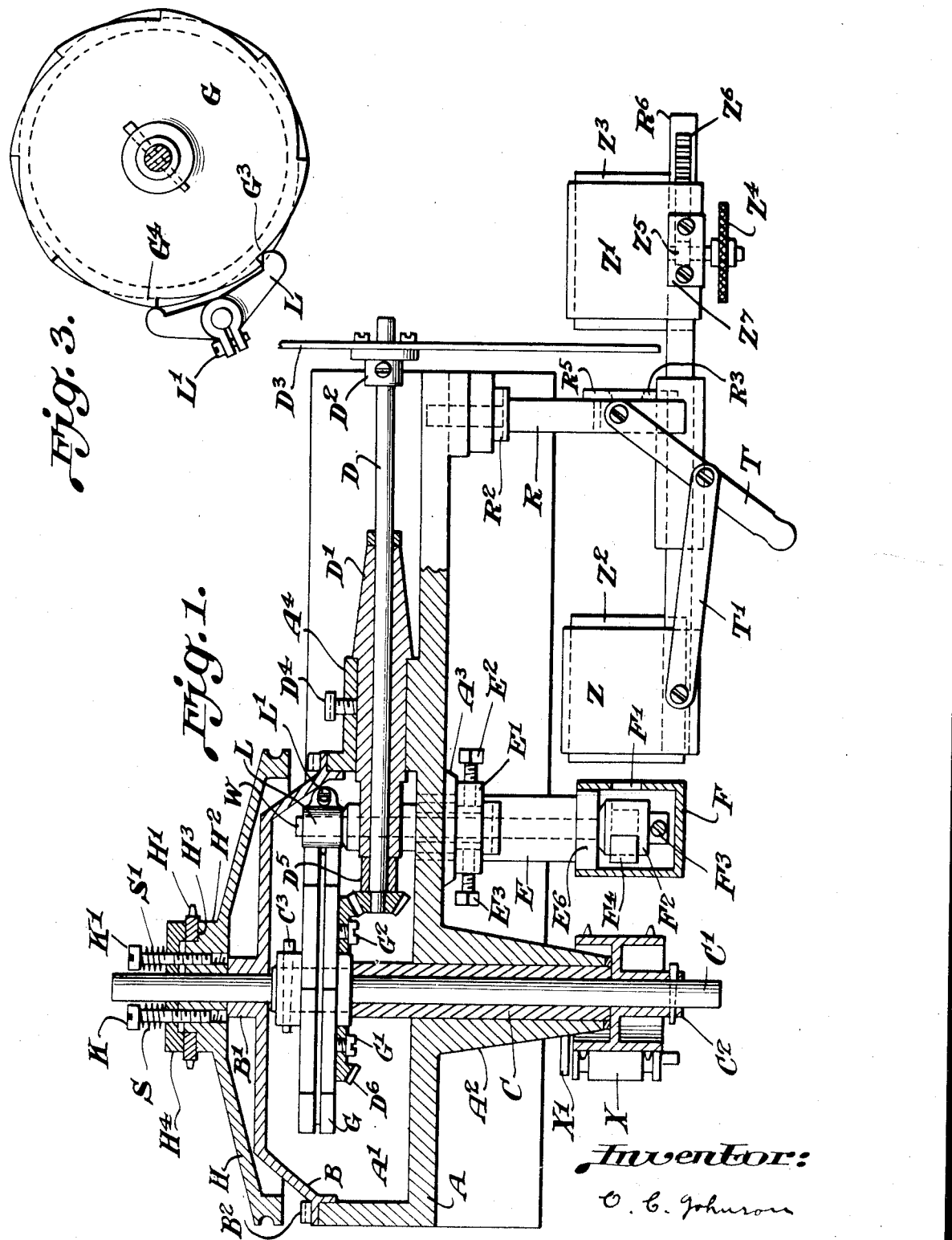
Inventor:
O. C. Johnson

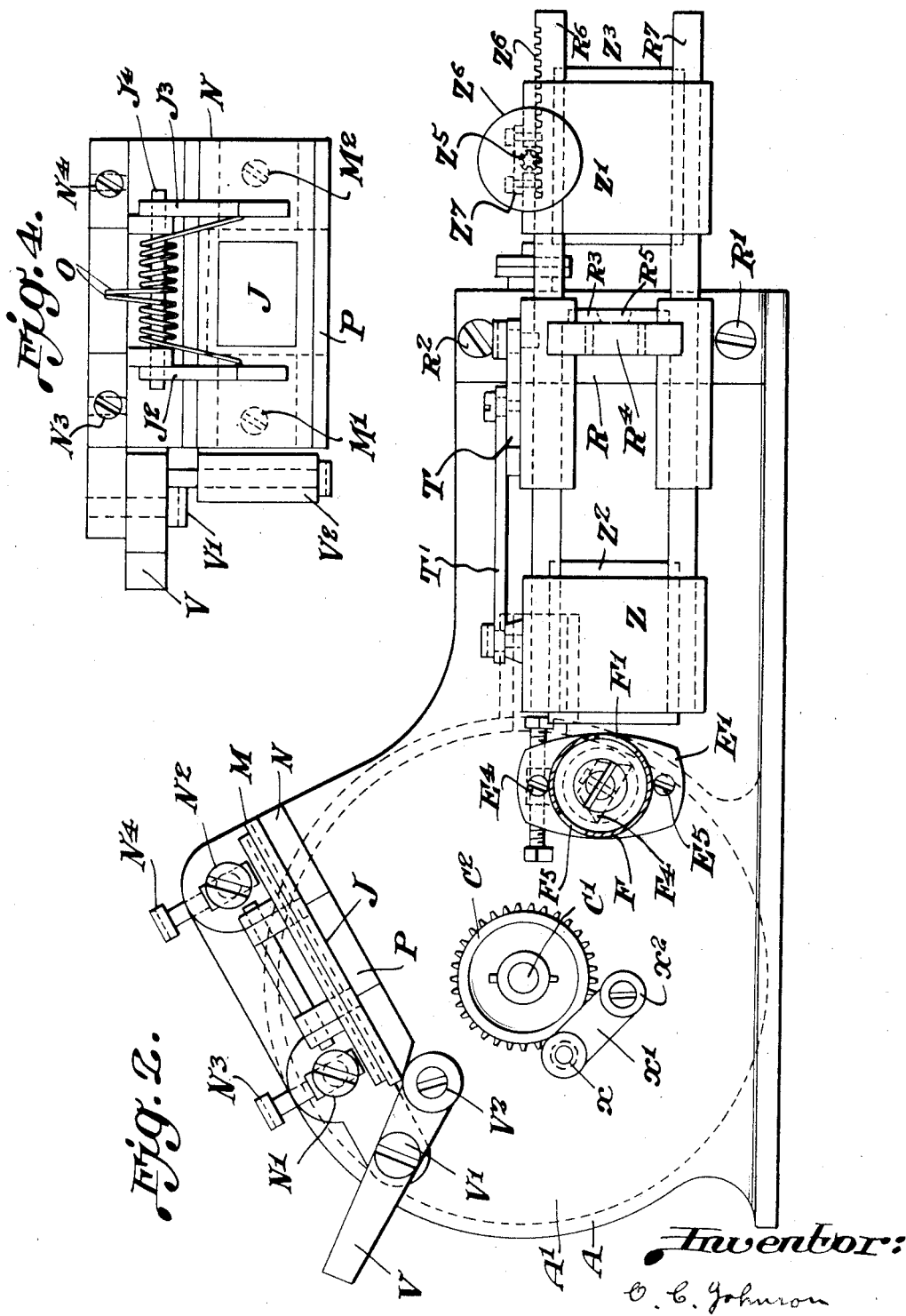

Patented Jan. 16, 1934

1,944,010

UNITED STATES PATENT OFFICE 1,944,010

CONTINUOUS FILM MOTION CINEMATOGRAPH PROJECTOR

Oscar Charles Johnson, Woking, England

Application August 15, 1930, Serial No. 475,535, and in Great Britain September 2, 1929

5 Claims. (Cl. 88—16.8)

The invention relates to a continuous film motion cinematograph projector which embodies very few motional parts, and in which the remaining few stationary parts and frame are of an extremely simple character, and cheaply manufactured. In this apparatus the film is continuously drawn through the gate by a film sprocket, the shaft of which also carries the oscillating mirror or prism operating cam, in addition to the shutter driving wheel or gear fastened thereto. The mirror or prism shaft rocker is operated directly off the said cam, and during all operating periods is locked relatively to the cam's contour, whereby obviating any local oscillation, in addition eliminating gear wheel train or other complicated transmission systems between the continuously revolving film sprocket and the oscillating mirror or prism, thus eliminating gear wheel back-lash, wear, bearing-play and constructional errors embodied more or less in various transmission systems. The result is that a perfectly steady picture is projected, even after continuous use. The said cam shutter wheel and prism or mirror-rockers are enclosed in an oil-bath formed by a projecting part of the frame, and having a cover-plate. They are so arranged that after removing the driving fly-wheel pulley clutch (hereinafter described) which is secured to the main shaft, the cover-plate may be removed for inspection of the few motional parts when they are either stationary or in motion. The film-gate is readily adjustable in its distance from the mirror, thereby correcting the angular motion of the prism or mirror to compensate for varying widths of film, and for wear of cam, if any.

The apparatus preferably employs a known optical system, which consists of a pair of lenses arranged in tandem, with a fixed mask plate interposed, its action relatively to the projector mechanism being hereinafter described. The projector could be easily adapted to sound-synchronized systems, thus simplifying the latter apparatus. The accompanying drawings, by way of example, illustrate an apparatus adapted for carrying my invention into effect. Figure 1 shows a part-sectional plan; Figure 2 a side-elevation thereof; Figure 3 the side elevation of the operating cam, and Figure 4 a plan of the film-gate.

The projector frame or body A (Fig. 1) is formed with an oil chamber, A1, closed by means of a cover, B, secured thereto by screws, B2, and incorporates a bearing, B1. In this closed chamber, A1, is mounted the operating cam, G, formed with parallel oppositely arranged sets of teeth of convenient uniform radius around the circumference, with a circumferential channel between the respective sets of teeth (Fig. 3). The said cam is fastened by a taper pin (C3) upon its driving shaft (C1), which in turn is mounted in a bearing bush (C) fixed within the frame's projecting boss (A2) and the cover bearing, B1, respectively.

The cam spindle, C1, carries near one end a film sprocket, C2, while the shaft's opposite end is furnished with a fly-wheel pulley, H, incorporating a friction clutch, and consists of a chain wheel sprocket, H1, mounted upon the pulley's boss, H2, formed with a collar, H3; the inner side of the said chain wheel, H1, is pressed against the collar, H3, by similar collar plate, H4, loaded preferably by two helical springs, S and S1, held in position by screws K and K1. Against the contour of cam G bear the ends of a rocker or lever, L, each end of the latter being engaged with its own operating sets of teeth (Figs. 1 and 3); the rocker or lever, L, is preferably centrally secured at one end of a shaft, W, preferably by a friction grip functioned by screw L1. The rocker's shaft, W, is mounted in an adjustable body, E, which functions the part of a bearing and is formed with a flange, E1, for fastening by screws, E4 and E5, to the boss A3 of frame A; the adjusting screws E2 and E3 of flange E1 furnish means whereby the body E and consequently its supported shaft, W, together with rocker, L, may be advanced or retracted and so alter the bearing pressure between the rocker's extremities and the cam's contour respectively. The other end of the rocker-operating shaft, W, is formed preferably with a slotted cylindrical head, F2, into which is secured a reflecting glass prism, F4, by a friction grip effected by drawing the upper and lower parts of the slotted head upon the prism by screw F3. If a reflecting mirror be employed in preference to a prism, shaft W is formed with a ring into which is fitted the said mirror. The prism or mirror is amply protected by a strong metallic cover, F, fitting over the enlarged end, E6, of body E. The two apertures F1 and F5 permit the light-beam to enter and emerge via the prism or mirror. The preferably two-bladed, extremely narrow shutter, D3, is fastened by a collar, D2, to a shaft, D, mounted in a bearing bush, D1, secured in the frame's lateral boss, A4, by a set screw, D4. The inner end of shaft D is furnished with a bevel wheel, D5, driven by a further bevel wheel, D6, fastened to the operating cam, G, by screws G1 and G2.

A sprocket film roller, X, pivoted to a spring-loaded arm, X1, holds the film upon the sprocket, C2. The said arm, being pivoted to frame A in a suitable position, is furnished with a film guide roller, X2.

The film gate consists of a body, N (Figs. 2 and 4) fastened preferably at the top of the frame, A, at a convenient angle by screws, N1 and N2, and incorporates a pair of gate runners which form part of a plate, M, fastened by the screws M1 and M2 to the top side of body N. This said plate is provided with an aperture, J, equal in length to two film pictures. A back-plate formed with similar aperture J, and a pair of gate runners, is pivoted by its two projecting arms, J2 and J3, to the body, N, by a spindle, J4, and, loaded with springs, O, completes the film trap. The cut-away portion, P, permits the light beam to pass through the said aperture. The lever, V, pivoted at V1 to the gate body, N, in conjunction with the film roller, V2, permits the film to be centred during the projection period. The screws N3 and N4 of body N (Figs. 2 and 4) are for adjusting, within limits, the distance between the film trap and prism F4, or mirror, to compensate for wear in the operating mechanism.

A bracket, R, is preferably fastened at the front end of frame A, vertically, by screws R1 and R2, and incorporates an aperture, R4, over which is fitted a mask plate, R3, provided with a picture mask, R5. The bracket, R, is furnished with two parallel horizontal rods, R6 and R7, upon which are mounted two lens jackets, Z and Z1, jacket Z being situated in front of the prism or mirror, and furnished with a large aperture lens, Z2, of predetermined focal length, preferably standard type of projection lens, capable of longitudinal motion. This motion is effected by the operating lever T, pivoted at one end to the bracket R and connected to the lens jacket Z by a connecting link, T1.

The other lens jacket, Z1, is situated in front of the picture mask plate R3 and R5, and is furnished with a large aperture, preferably standard type of projection lens, Z3, of any convenient focal length. Focussing is effected by a disc, Z4, which imparts a rotary motion to pinion Z5, the latter engaging with a rack, Z6, or rod R6, the pinion Z5 being held in contact with rack, Z6, and position by a bearing plate, Z7.

Spool arms of suitable design are fastened to the frame A in a convenient position and furnished with spool-boxes of an approved pattern, the take-up spool being driven by a chain of standard design from the chain-sprocket wheel. H1.

The action of my invention is as follows:—Assume that the projector is threaded with a film so that two full pictures will occupy the gate aperture, and are numbered 1, 2; and the following hidden picture is numbered 3 for explanatory purposes. Also assume that the gate aperture, J, is flooded with a light-beam from a light source within the lamp-house. A real, sharp image is now cast via the reflecting prism F4, or mirror, upon the mask-plate, R3, by the predetermined focus lens, Z2, of the two said pictures. Upon turning the projector by hand or motor power, the film sprocket C2 gradually draws the film through the gate, whereby No. 2 picture gradually replaces the original position of No. 1 picture, the corresponding film-change being counterbalanced by the prism F4 or mirror receiving a very small predetermined angular motion in the same direction as the moving film. The angular motion of the prism F4, or mirror, is effected by the cam's rotary motion, imparted by the sprocket spindle, C1, whereby one of the teeth G3 (Fig. 3) of cam G elevates one end of prism shaft rocker L, while the oppositely arranged parallel tooth, G4, of the cam permits the other end of rocker L to be lowered simultaneously. The combined effect of the moving film and the angular moving prism F4 or mirror is that the moving images are rendered stationary upon the mask-plate, R3, while the light-beam and perimeter image of the gate aperture J move accordingly. Upon No. 2 picture fully replacing the original position of No. 1 picture, and consequently, No. 3 replacing No. 2, the extremities of the respective two oppositely arranged teeth, G3 and G4 are reached. Whereupon the following pair of teeth returns the rocker L and its component parts to their original position at an extremely rapid rate, the shutter, D3, simultaneously covers the picture mask R5, and the above cycle of operations is repeated during the projection period. The picture mask, R5, permits only one of the two images to be projected by the projection lens, Z3, upon a screen suitably placed.

It will be readily observed that the respective distance between the gate and reflecting prism F4 or mirror is of ample dimensions, thereby permitting an exceedingly small angular motion of prism F4 or mirror and its component parts. These, in turn, may be made very small and consequently very light, thus reducing the inertia to a negligible amount, and so permitting almost any rate of change without impairing the endurance or reliability of action.

Having now particularly described and ascertained the nature of my said invention, and in what manner the same is to be performed, I declare that what I claim is:—

1. A continuous film-motion cinematograph comprising a frame formed with a main bearing co-axial with a formed, projecting oil-chamber which incorporates a lateral bearing-boss and is provided with a cover-plate; the frame having also secured to it a flange forming part of an adjustable bearing parallel with the main bearing; the main bearing carries a shaft on which is fixed, outside the oil-chamber, a film-operating sprocket in close proximity to the film gate, which is secured by screws at a convenient angle on the top of the frame, and in addition to carrying the film sprocket, the main shaft carries an operating cam situated within the oil-chamber and formed with parallel, oppositely arranged pairs of teeth which actuate the extremities of a rocker centrally secured to a shaft mounted in the adjustable bearing and carrying at the opposite extremity an oscillating reflector in line with the gate-aperture; the cam has fastened to it a gear wheel directly engaged with another wheel secured to a shaft mounted in the lateral bearing-boss and carrying the light-shutter; these parts being so synchronized in movement that a point of the moving film is rendered stationary, after reflection, by the oscillating reflector between the shutter occultations.

2. In projection mechanism as defined in claim 1, the adjustable bearing carries the reflector shaft with reflector and its actuating rocker, thus forming a complete unit which may be advanced, retracted or fixed in order to provide relative adjustment between the rocker extremities and the pair of oppositely-arranged, parallel teeth engaged at that moment; the adjustment being effected by means of screws in a flange which forms part of the bearing body.

3. In mechanism as defined in claim 1 the cam's parallel, oppositely-arranged pairs of teeth are so related to the reflector operating shaft rocker extremities that one tooth of a pair elevates one end of the rocker, while the other tooth permits the other end of the rocker to be lowered simultaneously, thus locking the said rocker extremities to the face of the cam during both the normal and the quick-return operating periods.

4. In projector mechanism as defined in claim 1, the oscillating reflector is protected from damage by a removable, fixed, cylindrical cover formed with inlet and outlet light apertures at right-angles to the reflector shaft, and mounted upon the reflector adjustable bearing-body.

5. In projector mechanism defined in claim 1, the film gate is adjustable in distance from the reflector by means of two screws, which bear at right angles upon two other supporting screws whose purpose is to secure the gate by its formed, slotted lugs to the frame; thus making it possible to vary the amplitude of the said reflector to compensate for varying film-pitch, and also permitting adjustments for the purpose of obtaining rock-steady picture projection.

OSCAR CHARLES JOHNSON.